Figure 2:
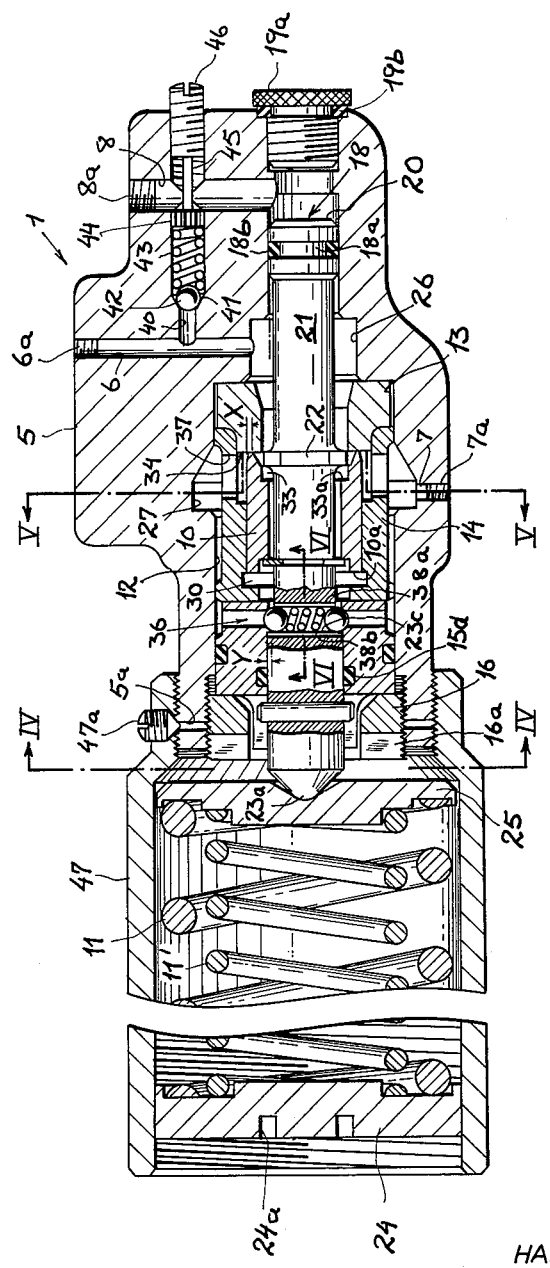

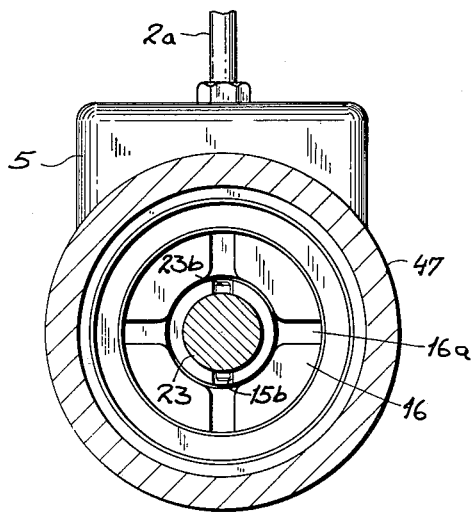
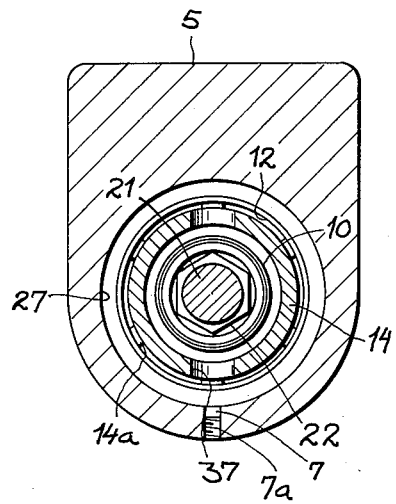
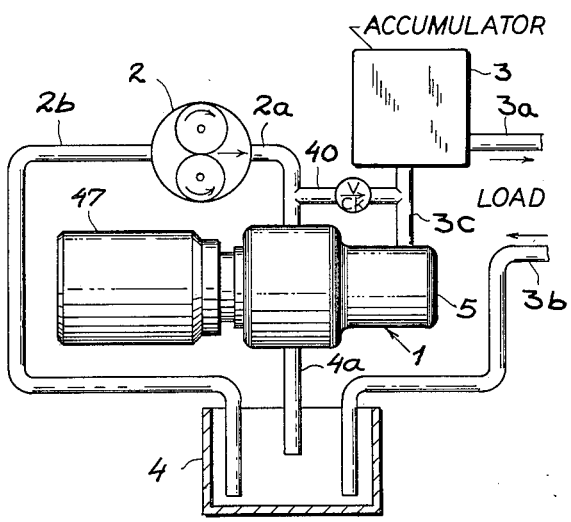
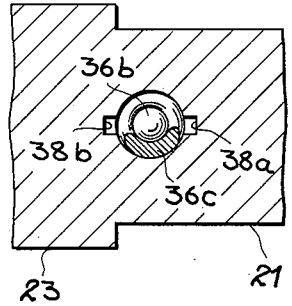

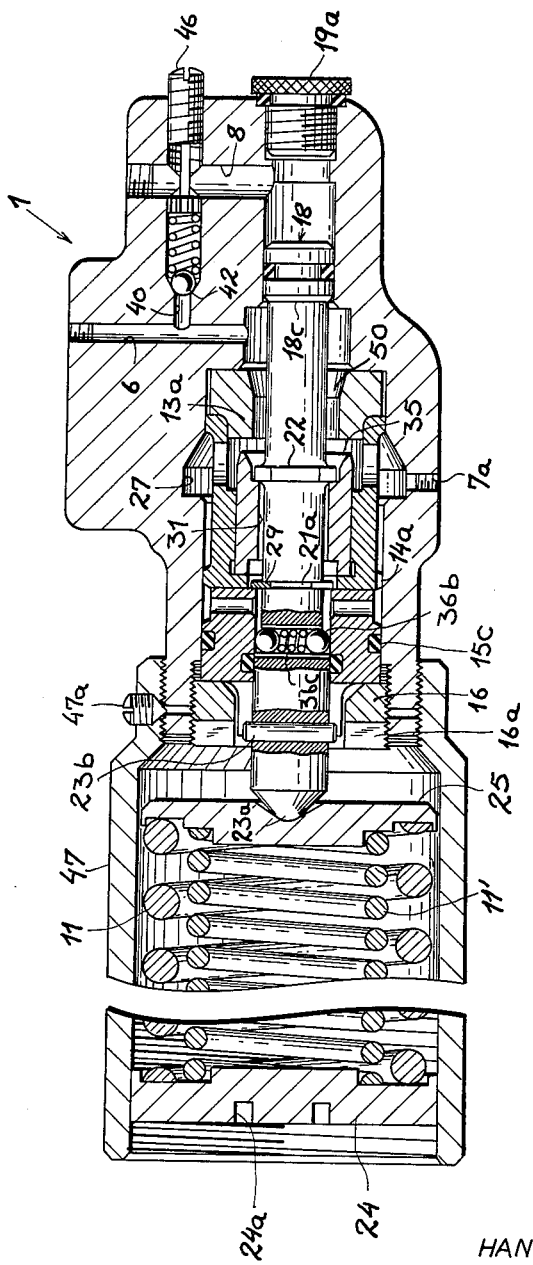

United States Patent Office 3,224,456
Patented Dec. 21, 1965

3,224,456
VALVE FOR THE CHARGING OF PRESSURE ACCUMULATORS
Hans-Christof Klein, Hattersheim (Main), Germany, assignor to Alfred Teves K.G., Frankfurt am Main, Germany, a corporation of Germany
Filed June 26, 1964, Ser. No. 378,215
Claims priority, application Germany, Aug. 2, 1961, T 20,536
5 Claims. (Cl. 137—115)

My present invention relates to a valve for the control of fluids under pressure and, more particularly, to a valve for the charging of a pressure accumulator in a hydraulic or pneumatic system. This application is a continuation-in-part of my copending application Ser. No. 212,057, filed July 24, 1962, and now abandoned.

In a system operated by a pressure medium such as hydraulic fluid or gas, a pressure accumulator is frequently provided in order to serve as a source equalizing pressure or of potential energy for the working parts of the apparatus. Thus in a hydraulic or pneumatic system, a source of fluid under pressure (e.g., a pump or compressor) is intermittently coupled with a pressure accumulator for charging same with pressure medium upon the pressure within the accumulator falling below a predetermined minimum value. The accumulator is generally coupled with the working elements, i.e., hydraulic or pneumatic cylinders or other fluid-responsive motors, and serves as a primary or secondary source of fluid for these elements.

It is an object of my invention to provide an improved valve for alternately connecting the pump or other source of pressure fluid with the accumulator and with a reservoir or the like at relatively low pressure, this valve remaining closed to permit charging of the accumulator to a definite level and thereafter opening until the fluid pressure in the accumulator has dropped to a predetermined but limited extent.

A more particular object of my invention is to provide a valve of this type which will not open prematurely and will not remain in an intermediate position.

A feature of my invention resides in a provision of a valve body with an inlet connectible to the high-pressure side of the associated fluid-supply system, an outlet connectible to the low-pressure side of such system and a chamber communicating with the accumulator served by the system, the inlet and outlet being interconnected by a passage which normally (i.e., in the cut-in state of the valve) is blocked by a closure member held in its closing position by the high-pressure fluid itself. An actuating member, normally indexed in one of two limiting positions, entrains the closure member into an unblocking position as soon as the accumulator pressure reaches its cut-out level; when this occurs, the fluid pressure acting upon the closure member is relieved so that the latter member quickly responds to an entraining force exerted on it by the associated actuating member. To this end, the closure member is advantageously designed as a differential piston and the blocking pressure exerted upon this piston is relieved by the opening of a normally blocked bypass of the passage interconnecting the inlet with the outlet, the blocking of the bypass being advantageously affected by the indexing means in all.

According to a further feature of the invention, the high-pressure fluid also acts upon the indexing means to help retain the actuating member in its normal terminal position.

The above and other objects, features and advantages of the present invention will become more readily apparent from the following description, reference being made to the accompanying drawing in which:

FIG. 1 is a diagrammatic view of a hydraulic installation according to the present invention;
FIG. 2 is an axial cross-sectional view of the accumulator-charging valve;
FIG. 3 is a view similar to FIG. 2 showing the valve stem in its "open" position;
FIG. 4 is a cross-sectional view taken along the line IV—IV of FIG. 2;
FIG. 5 is a cross-sectional view taken along the line V—V of FIG. 2; and
FIG. 6 is a cross-sectional view taken along the line VI—VI of FIG. 2.

In FIG. 1 I show a hydraulic installation wherein a pressure accumulator 3 supplies fluid to a load via a conduit 3a while a return conduit 3b conducts the pressure fluid to the sump or reservoir 4. The latter also supplies the pump 2 via a line 2b, the outflow of this pump being fed into the accumulator-charging valve via a high-pressure line 2a. Pump 2 charges the accumulator 3 via a line 40 provided with a check valve 1, which will be described in greater detail hereinafter, whenever the pressure in the accumulator falls below a predetermined minimum value. Accumulator 3 is charged with the pressure fluid, which may be a gas or liquid, until a predetermined maximum pressure is attained at which time valve 1 operates to bypass the fluid from pump 2 to the sump. The load may then be operated by the pressure in accumulator 3 until the pressure therein again falls below the predetermined value whereupon the bypass is cut off and charging is repeated.

In FIGS. 2–6 I show the valve 1 in greater detail. The valve body 5 is provided with a first inlet 6 which is coupled with the pressure line 2a of pump 2 via its threaded aperture 6a. A second inlet 8 communicates, via a threaded aperture 8a, with the accumulator 3 by way of its conduit 3c while a bore 7 and an aperture 7a form an outlet connected to the sump by line 4a.

The high-pressure inlet 6 for the pumping fluid is connected with the accumulator 3 by means of a bore 40 formed with a check valve as previously noted. The check valve may comprise a ball 42 which is urged against a conical seat 41 by a spring 43 whose restoring force may be adjusted via a screw 46 having a shank 45 of reduced cross-section so that the fluid flow through the inlet 8 is not materially affected. The shank 45 bears a perforated head 44 against which the spring 43 is seated.

The body 5 is provided with a longitudinally extending bore 17 which communicates with the inlet 8 and forms a chamber 19 at the latter. The bore 17 is closed at its right-hand end (FIGS. 2 and 3) by a knurled plug 19a which compresses a sealing ring 19b against the rear wall of the valve body. Bore 17 constitutes a cylinder for the piston-forming head 18 of an elongated actuating member or valve stem 21 which extends longitudinally within the body 5. Head 18 is formed with a circumferential groove 18a, which receives a sealing ring 18b, and a piston surface 20 within the chamber 19.

An annular chamber 26 is fed with the pump fluid via the radially extending inlet 6 and forms parts of a longitudinally extending passage. A bushing 13 surrounds the actuating member 21 with the clearance to produce an annular gap 50 which communicates with the chamber 26 and constitutes an extension thereof. This bushing is provided with a neck 13a which is centered within a sleeve 14 whose crenellated boss or spider 14a engages the inner wall of the tubular body 5 in the region of an annular passage 12. An annular pressure member 15 is held axially against the sleeve 14 and the bushing 13 by a clamping nut 16 threadedly received in the body. This nut is provided with radially extending slots 16a into which a tightening tool may be inserted for assembling the valve.

The sleeve 14 is provided with a pair of radial bores 37 communicating with an annular chamber 27 into which the outlet 7 opens and which constitutes an extension of annular passage 12. The sleeve surrounds an axially slidable closure member 10 which is formed as another sleeve coaxial with the actuating member 21 and the sleeve 14 enveloping it. The bushing 13 has a transversely extending annular seating surface 34 against which the sealing edge 35 of closure member 10 comes to rest in a first extreme position of this member. Thus the member 10 and bushing 13 constitute a valve interposed in the passage 26, 50, 37, 27, 7 between the pump and the sump. Since the annular clearance 31 between the closure member 10 and the actuating member 21 establishes communication between the aforementioned passage and a recess 30 in sleeve 14, the rear surface 10a of the closure member constitutes the larger one of two oppositely effective piston surfaces of a differential piston so that member 10 is urged into engagement with its seat 34 by the pressure of the pump fluid. The width of the effective piston area is designated X in FIG. 2.

A prismatic abutment 22 on the actuating member 21 forms a stop surface which is engageable with the corresponding surface 33a of the closure member 10 and its annular recess 33. A further abutment, consisting of a split ring 29 received in a circumferential groove 21a, is engageable with the corresponding surface 10a of closure member 10 but permits the passage of fluid from clearance 31 to recess 30. It will be understood that the axial spacing between the surfaces 10a and 33a of member 10 is less than the spacing between abutments 22 and 29 so that this abutment means forms a lost-motion connection between the actuating member and the closure member. The pump pressure prevailing in recess 30 is also communicated to the enlarged end 23 of the actuating member 21 via an extension of passage 30, 31 which includes a radial bore 36a with lateral flutes 38a, 38b in member 21 just ahead of its surface 23c, which has a radius larger by an amount Y than the faces 20 and 18c of head 18. Member 21 thus operates as a piston with two faces 20 and 23a aidingly acted upon by fluid pressure from inlets 6 and 8 respectively.

The pressure bushing 15 is provided with a pair of radial bores 15a which are normally aligned with bore 36a of member 21 and communicate with the outlet 7 through the annular passage 12. The actuating member 21 is releasably retained in its normal or right-hand terminal position (FIG. 2) by indexing means 36 comprising a pair of balls 36b which are urged radially outwardly by a compression spring 36c lodged in the bore 36a. The bushing 15 is provided with an external sealing ring 15c and an inner sealing ring 15d. The neck 15b of the bushing is centered within the clamping nut 16 and is provided with a radially extending slot in which a radial pin 23b of the enlarged portion 23 of stem 21 is received in order to limit relative angular motion.

A casing 47 is threaded onto the left-hand end of valve body 45 and is held in place by a set screw 47a which extends into a bore 5a in the valve body. The enlarged portion 23 projects forwardly through the valve body and has a rounded point 23a against which a plate 25 with its conical recess 25a is rotatably seated. A pair of coaxial compression coil springs 11 and 11' bear against the inner plate 25 and an outer plate 24 which is threaded into the casing 47. Plate 24 is provided with openings 24a which are adapted to receive a tool for driving the plate 24 toward plate 25. This arrangement constitutes adjusting means for regulating the restoring force acting upon the actuating member 21.

In operation, the valve 1 functions as follows:

With the actuating member 21 in its normal position illustrated in FIG. 2, the balls 36b hold this member against displacement by partially entering the bores 15a of bushing 15 under pressure of their spring 36c and of the fluid from inlet 6 which has access to the bore 36a over the aforedescribed path 31, 30, 38a. This fluid, under pressure from pump 2 (FIG. 1) connected to inlet 6, is prevented from returning to the sump 4 by the closure member 10, which blocks the bores 37, and by the balls 36a, which obstruct the passage 15a, 12. Thus the full force of the pump pressure is available to bear upon the rear face 10a of valve member 10 whereby the latter is held in its blocking position shown in FIG. 2. The same fluid pressure acts upon the rear face 18c of piston head 18, yet this force is outweighed by the pressure of the fluid upon the large-diameter face 23a of end portion 23 so that the net pump force exerted upon actuating member 21 is to the left, in aiding relationship with the storage pressure from the fluid in the accumulator 3 as communicated to the piston face 20 by way of chamber 19. When the excess of the combined fluid pressure over the counteracting pressure of restoring springs 11 and 11' surpasses the retaining force exerted by the indexing means 36, the detent elements or balls 36b are cammed inwardly so as to release the member 21 for movement into its off-normal position shown in FIG. 3. At the same time, the balls 36b unblock the return flow of the high-pressure fluid to the low-pressure chamber 27 by way of bores 15a so that the pressure in the channel system communicating with inlet 6 momentarily collapses. Thus, valve member 10 is no longer urged into its blocking position (FIG. 2) but readily yields to the axial force exerted upon it by the abutment 22 of the member 21 as it shifts toward the left, being thereby entrained into its unblocking position illustrated in FIG. 3. The system remains in this position until the fluid pressure in chamber 19 has dropped sufficiently, with continuing depletion of the accumulator 3, to allow the springs 11, 11' to restore the actuating member 21 and, with it, the valve member 10 to its position of closure whereupon the cycle is repeated.

It will be noted that the axial spacing between abutments 29 and 22 on member 21 slightly exceeds the axial length of the intervening portion of member 10 so that the bypass from inlet 6 to outlet 7 is not fully opened until the member 21 has acquired a certain momentum in its rightward displacement, the resulting impact insuring that member 10 does not remain in an intermediate position and that both members 10, 21 reach their alternate limiting position shown in FIG. 3.

Conversely, the valve member 10 is not returned to its blocking position until the last stage of the restoring motion of actuating member 21 so that, throughout virtually the entire return stroke, the springs 11, 11' act only against the fluid pressure in chamber 19 as applied to piston face 20, there being no pressure upon the transverse face 23a formed by the shoulder 23 adjacent bore 36a. Thus, the reclosing of the valve 1 will occur after only a limited drop in accumulator pressure which, accordingly, will fluctuate between relatively narrow limits.

I claim:

1. In a valve for the charging of a pressure accumulator with a fluid from a supply system having a high-pressure and a low-pressure side, in combination, a valve body formed with an inlet connectable to said high-pressure side, a chamber connectable with said accumulator, an outlet connectable to said low-pressure side, and a passage in said body interconnecting said inlet and said outlet; an actuating member adapted to be operated by fluid pressure from the accumulator extending within said body into said chamber for displacement within said body from a normal terminal position toward an off-normal position; a closure member displaceable in said body relatively to said actuating member between a first position blocking said passage and a second position wherein said passage is unblocked, said closure member having the shape of a differential piston with a smaller and a larger end face exposed in its first position to oppositely directed forces due to fluid pressure within said passage tending to maintain said closure member in said first position; restoring means engaging said actuating member for resisting displacement thereof from said normal position into said off-normal position, said actuating and closure members being provided with co-operating first and second formations engageable with each other upon displacement of said actuating member from and into said normal position whereby said closure member is entrained from said first to said second position and vice versa, respectively; indexing means yieldably engaging said actuating member in said normal position; and means forming a bypass for said passage normally obstructed by said indexing means, said indexing means being movable into a nonobstructing position by the displacement of said actuating member from said normal position, thereby relieving the fluid pressure within said passage.

2. In a valve member for the charging of a pressure accumulator with a fluid from a supply system having a high-pressure and a low-pressure side, in combination, a valve body formed with an inlet connectable to said high-pressure side, a chamber connectable with said accumulator, an outlet connectable to said low-pressure side, and a passage in said body interconnecting said inlet and said outlet; an actuating member adapted to be operated by fluid pressure from the accumulator extending within said body into said chamber for displacement within said body from a normal terminal position toward an off-normal position; a closure member displaceable in said body relatively to said actuating member between a first position blocking said passage and a second position wherein said passage is unblocked, said closure member having the shape of a differential piston with a smaller and a larger end face exposed in its first position to oppositely direct forces due to fluid pressure within said passage tending to maintain said closure member in said first position; restoring means engaging said actuating member for resisting displacement thereof from said normal position into said off-normal position, said actuating and closure members being provided with co-operating first and second formations engageable with each other upon displacement of said actuating member from and into said normal position whereby said closure member is entrained from said first to said second position and vice versa, respectively; indexing means yieldably engaging said actuating member in said normal position, said actuating member having a piston surface exposed to the fluid of said passage for exertion of fluid pressure upon said surface supplementing the fluid pressure in said chamber in urging said actuating member toward said off-normal position; and means forming a bypass for said passage normally obstructed by said indexing means, said indexing means being movable into a nonobstructing position by the displacement of said actuating member from said normal position, thereby relieving the fluid pressure within said passage and upon said surface.

3. The combination defined in claim 2 wherein said actuating member has a transverse bore communicating with said passage, said indexing means including a detent element seated in said bore and spring means in said bore urging said detent element outwardly into engagement with said valve body, the action of said spring means being supplemented by fluid pressure from said passage.

4. The combination defined in claim 3 wherein said actuating member is formed with a shoulder having a transverse face just beyond said bore, said transverse face constituting said piston surface.

5. The combination defined in claim 2 wherein said first and second formations are so spaced from one another as to delay the entrainment of said closure member by said actuating member into said first and second positions.

References Cited by the Examiner
UNITED STATES PATENTS

| 1,594,177 | 7/1926 | Knauf | 251—44 X |
|---|---|---|---|
| 1,799,587 | 4/1931 | Heywood | 137—108 |
| 2,339,378 | 1/1944 | Clench | 137—108 |
| 2,372,016 | 3/1945 | Rockwell | 137—108 |
| 2,989,972 | 6/1961 | Brady | 137—108 |

OTHER REFERENCES 1,211,206   10/1959   France.

WILLIAM F. O'DEA, Primary Examiner.